(12) United States Patent
Scanzillo (10) Patent No.: US 6,773,167 B2
(45) Date of Patent: Aug. 10, 2004

(54) MECHANICAL SPLICE OPTICAL FIBER CONNECTOR

(75) Inventor: Thomas Scanzillo, Trumbull, CT (US)

(73) Assignee: The Siemon Company, Watertown, CT (US)

( * ) Notice: Subject to any disclaimer, the term of this patent is extended or adjusted under 35 U.S.C. 154(b) by 167 days.

(21) Appl. No.: 09/960,555

(22) Filed: Sep. 21, 2001

(65) Prior Publication Data

US 2002/0048435 A1 Apr. 25, 2002

Related U.S. Application Data

(60) Provisional application No. 60/234,478, filed on Sep. 22, 2000.

(51) Int. Cl.$^7$ ................................................. G02B 6/38
(52) U.S. Cl. ......................................... 385/55; 439/460
(58) Field of Search .............................. 385/53, 55, 58, 385/60, 76–78; 439/460, 462, 463

(56) References Cited

U.S. PATENT DOCUMENTS

| 4,435,036 A | 3/1984 | Sasakawa |
| 4,812,006 A | 3/1989 | Osborn et al. |
| 4,923,274 A | 5/1990 | Dean ........................ 350/96.21 |
| 5,341,448 A | 8/1994 | Huebscher .................... 385/97 |
| 5,394,496 A | 2/1995 | Caldwell et al. ............... 385/70 |
| 5,748,819 A | 5/1998 | Szentesi et al. ............... 385/60 |
| 5,963,699 A | 10/1999 | Tanaka et al. ................. 385/97 |
| 6,173,097 B1 | 1/2001 | Throckmorton et al. ....... 385/59 |
| 6,179,480 B1 * | 1/2001 | Bella et al. .................... 385/76 |

FOREIGN PATENT DOCUMENTS

EP 0 626 602 A1 11/1994

OTHER PUBLICATIONS

International Search Report, PCT/US 01/29868, Apr. 11, 2003.

* cited by examiner

Primary Examiner—Khiem Nguyen
(74) Attorney, Agent, or Firm—Cantor Colburn LLP (57) ABSTRACT

A linear sliding locking mechanism includes: a base having a passageway; a plurality of fingers having a first end and a second end, the plurality of fingers surrounding the passageway and extending from the base at the second end; a sliding activation piece surrounding the plurality of fingers; and wherein as the sliding activation piece is moved from the second end towards the first end, the plurality of fingers are biased together. In another exemplary embodiment, a mechanical splice connector for a fiber optical cable includes: a linear sliding locking mechanism; an inner housing having a first end and a second end, the first end adapted to receive the linear sliding locking mechanism; a capillary supported by the inner housing; and a ferrule having a first side and a second side, the first side of the ferrule mounted to the second end of the inner housing, the ferrule including a fiber stub extending from the second side, the fiber stub extends within the capillary.

25 Claims, 11 Drawing Sheets

MECHANICAL SPLICE OPTICAL FIBER CONNECTOR

CROSS-REFERENCE TO RELATED APPLICATION

The present application claims the benefit of the date of the earlier filed provisional application, having U.S. Provisional Application No. 60/234,478, filed on Sep. 22, 2000, which is incorporated herein in its entirety.

BACKGROUND OF THE INVENTION

An optical connector arrangement generally provides an arrangement for the mating of optical fibers, particularly, the mating of two pairs of optical fibers. The arrangement includes connectors that mate at an adapter. A fiber optical cable is terminated at each connector. The cable contains individual optical fibers having ends which, when the cable is properly terminated, are disposed within the connector and positioned to be available for mating with other optical fibers.

Proper termination of fiber optical cable to a connector is critical to ensure proper functioning of the fiber connection. Improper termination of a connector can lead to increased connector attenuation and internal reflections, degrading overall connector performance.

Various devices and methods of fiber connector termination exist. Epoxy-based connectors employ adhesive epoxy to retain the individual optical fibers within the connector, thus properly positioning the fiber to mate with an opposing fiber. Epoxy termination, however, is time consuming and labor intensive, requiring the preparation and curing of the epoxy. Terminating a connector using adhesive epoxy can take anywhere from several minutes to an hour or more and often requires use of an epoxy curing oven and associated tools. Thus, epoxy-based termination is not particularly suited for field termination of connectors.

SUMMARY OF THE INVENTION

The above discussed and other drawbacks and deficiencies of the prior art are overcome or alleviated by a linear sliding locking mechanism for a fiber optical cable. In an exemplary embodiment of the invention, the linear sliding locking mechanism includes: a base having a passageway; a plurality of fingers having a first end and a second end, the plurality of fingers surrounding the passageway and extending from the base at the second end; a sliding activation piece surrounding the plurality of fingers; and wherein as the sliding activation piece is moved from the second end towards the first end, the plurality of fingers are biased together. In another exemplary embodiment, a mechanical splice connector for a fiber optical cable includes: a linear sliding locking mechanism; an inner housing having a first end and a second end, the first end adapted to receive the linear sliding locking mechanism; a capillary supported by the inner housing; and a ferrule having a first side and a second side, the first side of the ferrule mounted to the second end of the inner housing, the ferrule including a fiber stub extending from the second side, the fiber stub extends within the capillary.

BRIEF DESCRIPTION OF THE DRAWINGS

Referring now to the drawings wherein like elements are numbered alike in the several Figures.

DETAILED DESCRIPTION

Figure 1:
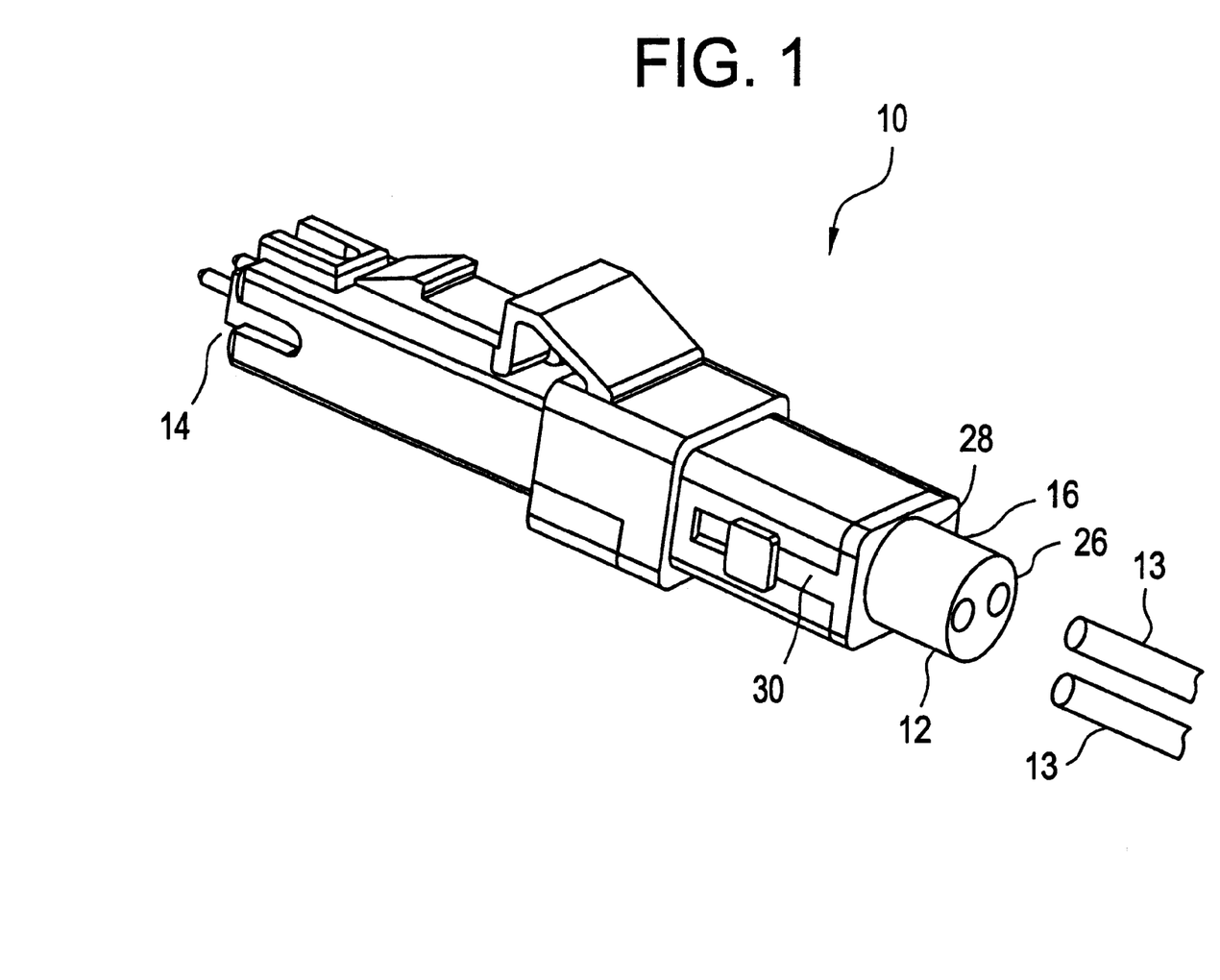
FIG. 1 is a perspective view of a mechanical splice optical fiber connector.
Figure 2:
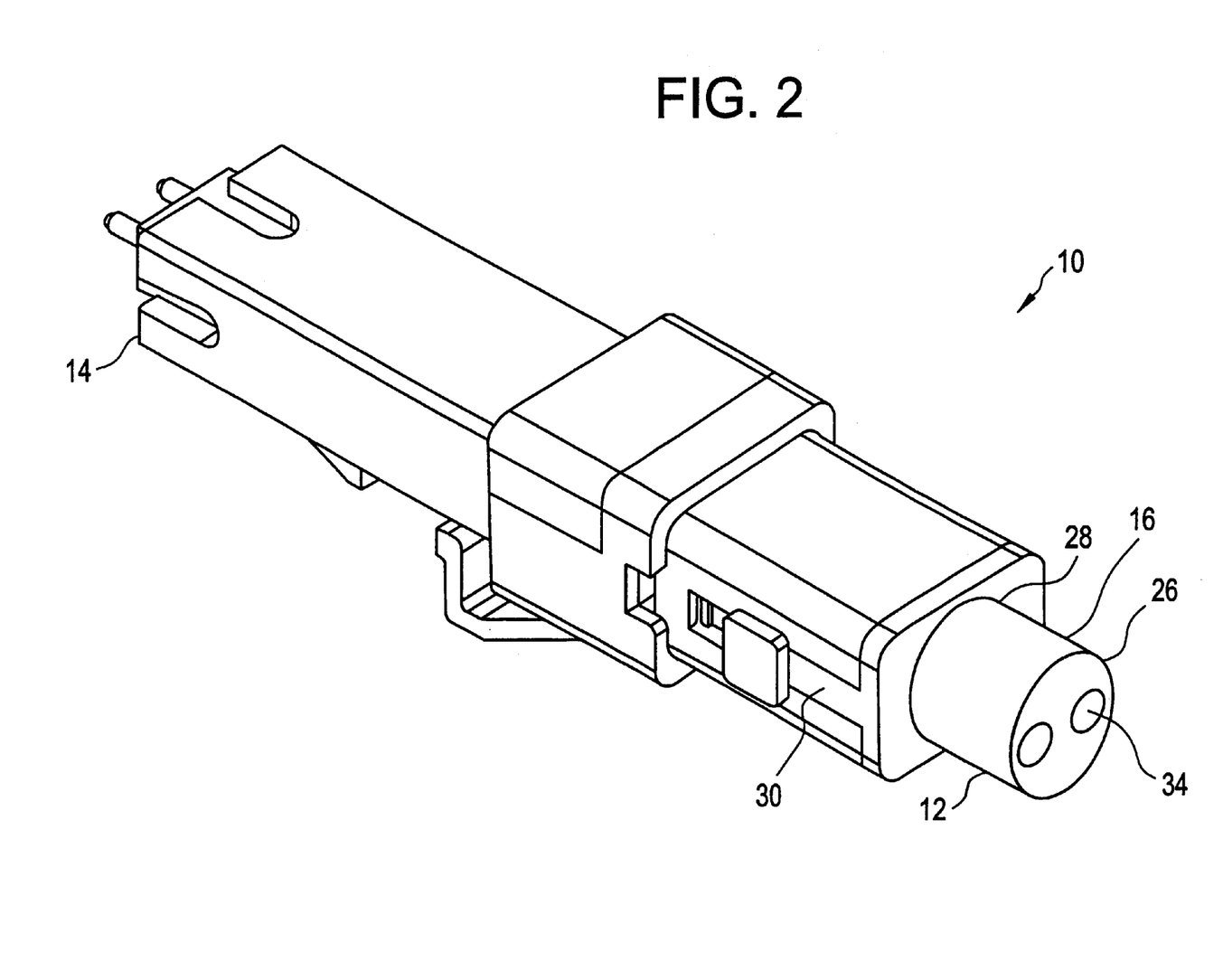
FIG. 2 is another perspective view of the fiber optic connector of FIG. 1.
Figure 3:
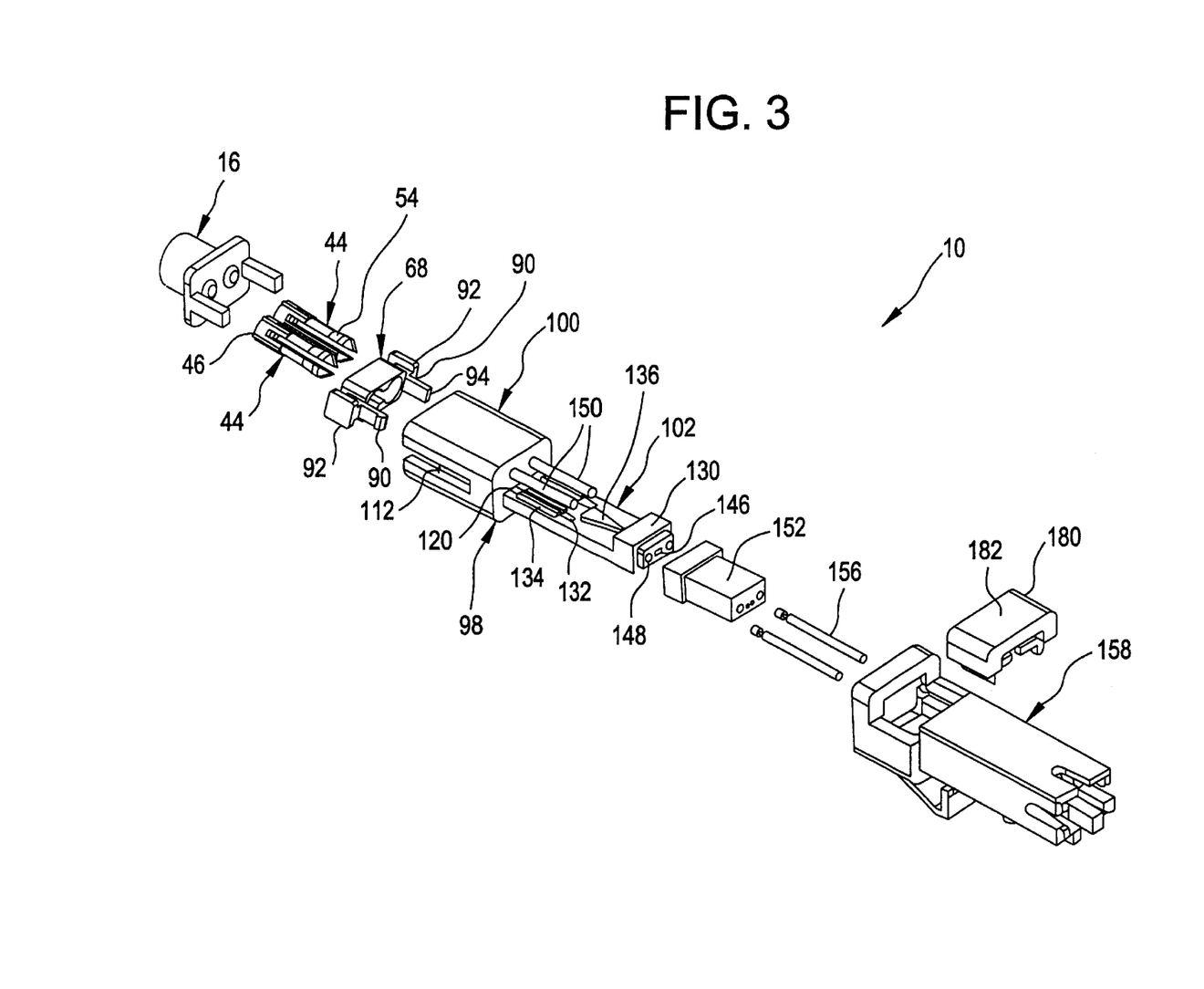
FIG. 3 is an exploded perspective view of the fiber optic connector of FIG. 1.

FIGS. 1–3 depict a mechanical splice optical fiber connector 10. Connector 10 includes a first end 12 and an opposing second end 14. First end 12 is formed for reception of a fiber optical cable 13. Cable 13 includes at least one optical fiber and preferably includes two cables 13. Second end 14 is formed to mate with, for example another connector in an adapter.

Referring now to FIGS. 1–4, mechanical splice optical fiber connector 10 includes a rear cap 16. Rear cap 16 includes a face plate 18. Face plate 18 is a thin member and, in one embodiment, is substantially rectilinear in shape. Face plate 18 includes a first side 20 and an opposing second side 22. First side 20 faces first end 12. Second side 22 faces second end 14.

Figure 4:
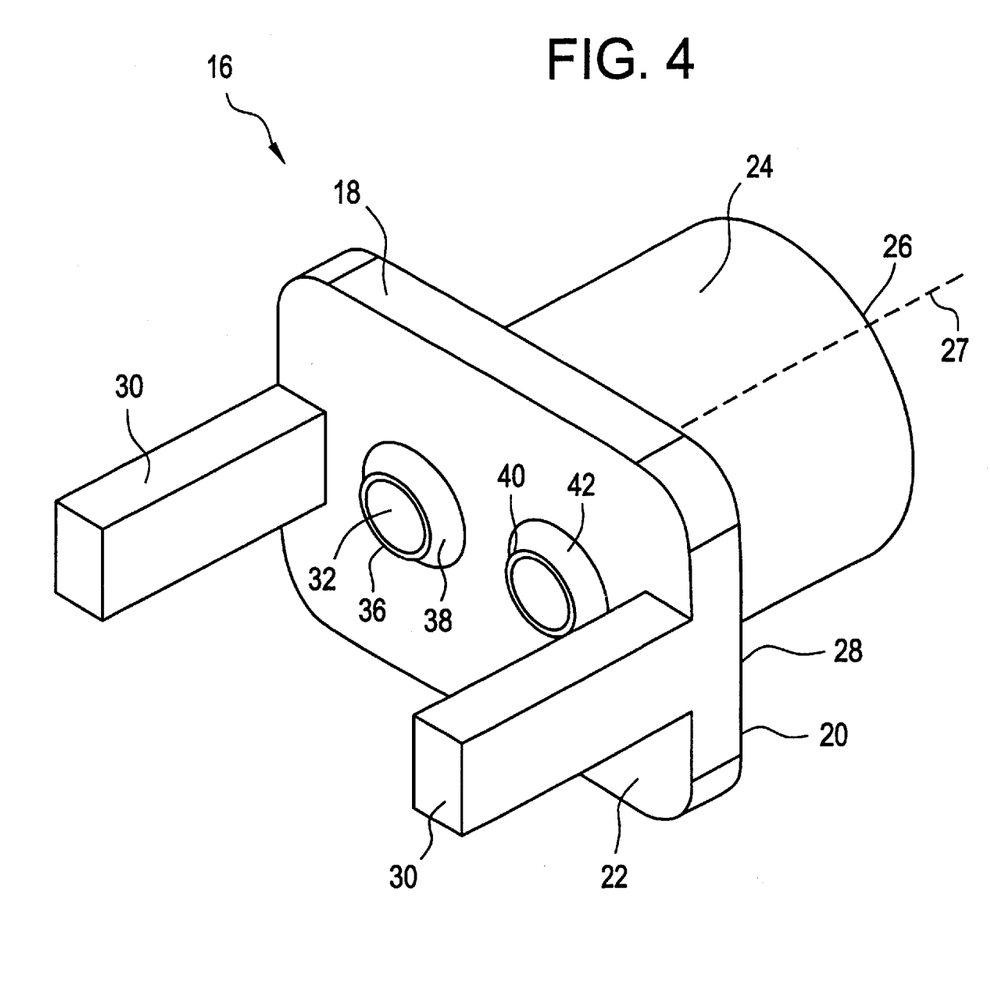
FIG. 4 is a perspective view of a rear cap.

Rear cap 16 also includes cable mating portion 24. Cable mating portion 24, in one embodiment, is substantially a cylindrical member connected to first side 20 and extending therefrom. Portion 24 includes a first end 26 formed proximate first end 12 and an opposing second end 28. Cable mating portion 24 is mounted to face plate 18 at second end 28 such that first end 26 extends perpendicularly from face plate 18. Specifically, a longitudinal axis 27 of portion 24 is positioned perpendicular face plate 18. Mating portion 24 includes a cross-sectional area and a specific cross-sectional shape particularly suited for connection with a fiber optical cable as described further herein. For example, mating portion may have a circular cross-section.

Rear cap 16 additionally includes at least one arm 30 that extends from second side 22. Arm 30 is substantially rectilinear in shape and is formed so as to extend perpendicularly from face plate 18. In an exemplary embodiment, rear cap 16 includes two arms 30 formed parallel one another at opposite ends of face plate 18.

Rear cap 16 also includes at least one fiber passageway 32 formed therein. In an exemplary embodiment, rear cap 16 includes two fiber passageways 32 formed parallel one another. Fiber passageways 32 extend through face plate 18 and through cable mating portion 24 substantially parallel to longitudinal axis 27 of cable mating portion 24. Passageways 32 include first openings 34 formed at first end 26. Correspondingly, passageways 32 include second openings 36 formed at face plate second side 22. Passageways 32 are shaped and sized to facilitate the reception, passage, and retainment of optical fibers.

Rear cap 16 also includes annular flanges 38 formed about second openings 36 at face plate second side 22. Annular flanges 38, in an exemplary embodiment are shaped frusto-conically and extend from second side 22 such that an extension end 40 is of a radius smaller than that of a mounted end 42 where mounted end 42 is fixed to face plate 18 and extension end 40 extends therefrom.

Rear cap 16 may be made of any material suitable for the applications discussed herein with respect to the scope of the present invention. More specifically, rear cap 16, in one embodiment, is constructed of molded plastic. Alternatively, in another embodiment, rear cap 16 is composed of a plurality of materials, for example, face plate 18 and arms 30 are constructed of hard plastic while cable mating portion 24 is constructed of a resilient material, such as rubber. Of course, face plate 18, portion 24, and arms 30 may be individually formed and then mounted together to assembly rear cap 16 or integrally formed to define rear cap 16.

Referring now to FIGS. 1–5, mechanical splice optical fiber connector 10 also includes at least one gripping collet 44. Gripping collet 44 includes a base portion 46. Base portion 46 is substantially cylindrical in shape, that is, having a circular cross-section. Base portion 46 includes a first end 48 and an opposing second end 50. Gripping collet 44 also includes a fiber passageway 52 formed therethrough. Passageway 52 extends from first end 48 through base portion 46 to second end 50 and is formed concentrically relative to the circular cross-section of base portion 46.

Figure 5:
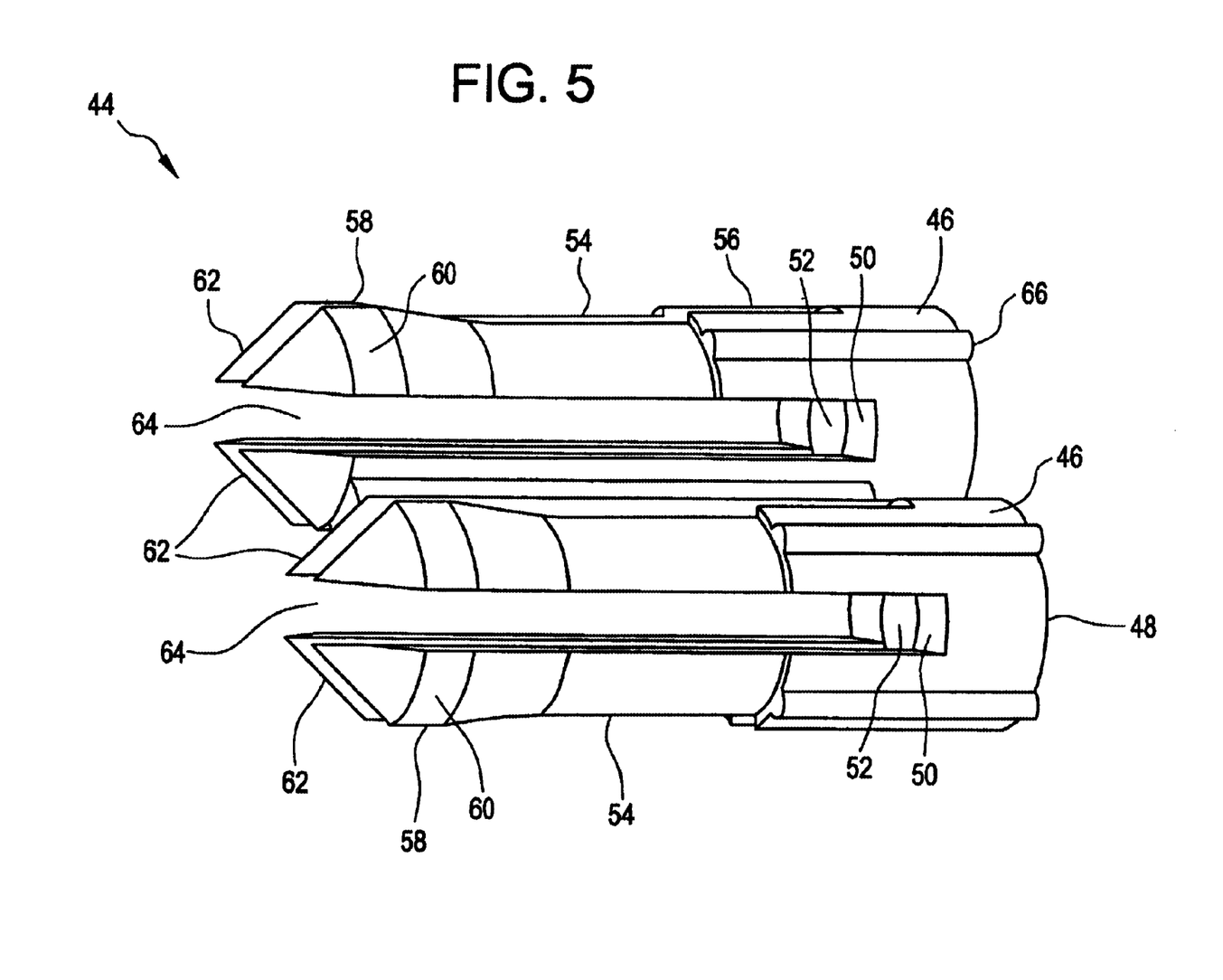
FIG. 5 is a perspective view of a gripping collet.

Gripping collet 44 also includes a plurality of fingers 54. Fingers 54 are connected to base portion 46 at second end 50, about fiber passageway 52. Fingers 54 extend from second end 50 substantially perpendicular from second end 50 and substantially parallel to that of fiber passageway 52.

Each finger 54 includes a base end 56 and an opposing tip end 58. Base end 56 is mounted atop or, alternatively, formed integral with base portion 46 at second end 50. Tip end 58 is of a particular shape suitable for gripping an optical fiber as discussed herein. Tip end 58 includes a raised band 60 of a greater cross-sectional area than that generally of the finger. Tip end 58 also includes a tapered portion 62 formed adjacent raised band 60. Tapered portion 62 is semi-conical in shape, decreasing in cross-sectional area at points distal from raised band 60.

Fingers 54 are generally resilient members which extend from base portion 46. Resilient fingers 54 are capable of pivoting at base ends 56. Thus, tip ends 58 may be drawn together.

In an exemplary embodiment, gripping collet 44 includes four fingers 54 formed integrally with base portion 46 at second side 50. The fingers are generally formed parallel relative one another and parallel to the direction of fiber passageway 52. Base ends 56 of the four fingers are mounted at second end 50 about fiber passageway 52, such that a biasing space 64 is formed between the fingers. As discussed herein, fingers 54 are biased about base ends 56 to facilitate reception and retainment of optical fibers. The four fingers may be biased into biasing space 64 so as to bring tip ends 58 of the respective fingers into proximity. In so doing, four tapered portions 62 combine to form a cone like shape. That is, each tip end 62 of the four fingers is shaped so as to resemble one-fourth of a cone.

Gripping collet 44 may also include base supports 66 formed at base portion 46 and base end 56. Base supports 66 lend support to the interface of base portion 46 and fingers 54. Also, base supports 66 facilitate the biasing of fingers 54.

In an exemplary embodiment, at least one gripping collet 44 includes two gripping collets 44 positioned adjacent to one another as shown in FIGS. 3 and 5. Gripping collets 44 may be of any material suitable for the various applications of the collet and the mechanical splice optical fiber connector 10 contemplated within the scope of the present invention. For example, collets 44 may be integrally formed of molded plastic. Alternatively, fingers 54 may be formed of a resilient material separately from the formation of base portion 46 of a sturdy plastic. Also fingers 54, particularly that portion of the fingers proximate biasing space 64, may be formed to include a gripping surface, that is a surface of increased friction to facilitate retainment of optical fibers as discussed herein.

Referring now to FIGS. 1–6, mechanical splice optical fiber connector 10 also includes a sliding activation piece 68. Sliding activation piece 68 includes a body 70. In one embodiment, body 70 is substantially shaped as a rectilinear solid having a first end 72 and an opposing second end 74. Body 70 further includes sides 76 formed perpendicular to first and second ends 72 and 74.

Figure 6:
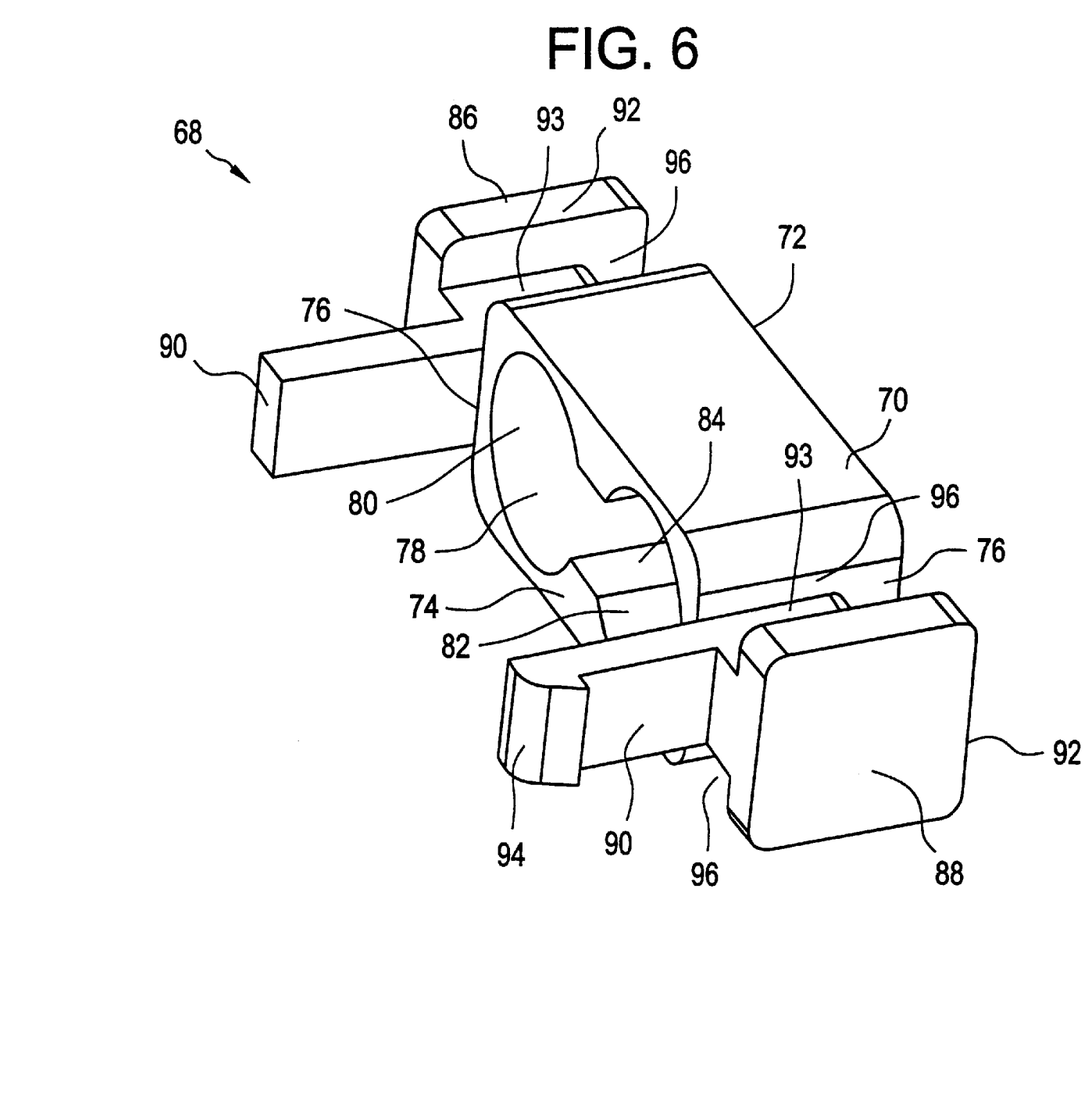
FIG. 6 is a perspective view of slide activation piece.

A channel 78 is formed through body 70 such that the channel extends from first end 72 to second end 74. Channel 78 is shaped to receive and retain gripping collets 44. More specifically, channel 78 includes a first and second portions 80 and 82 for receiving two gripping collets 44, respectively. Channel 78 also includes a third portion 84 formed between first and second portions 80 and 82 providing fluid communication therebetween.

As described further herein, upon assembling mechanical splice fiber optical connector 10, sliding activation piece 68 is positioned about collets 44. That is, the collets are inserted into channel 78 at first end 72 and pass through body 70 to emerge therefrom at second end 74.

Within connector 10, as will be discussed, sliding activation piece 68 is capable of moving along the length of collets 44. The interior shape of first and second portions 80 and 82, which pass over and about collets 44, is such that as slide activation piece 68 is moved toward tip ends 58, fingers 54 are biased together. That is, as slide activation piece 68 traverses the length of collets 44, fingers 54 are pinched together, biasing about base portions 46 at a linearly increasing magnitude, as sliding activation piece 68 approaches tip ends 58.

Sliding activation piece 68 also includes first and second side pieces 86 and 88 disposed opposite one another on opposing sides 76. First and second side pieces 86 and 88 each include an arm 90 having an activation slide tab 92 connected thereto. Arm 90 is an elongated member mounted to side 76 and extending therefrom in a direction parallel to that of channel 78. Arm 90 of second side piece 88 includes a latch 94 disposed at an end of arm 90 distal side 76. Activation slide tabs 92 are disposed atop arms 90, proximate sides 76. Tabs 92 are generally rectilinear solid members sized for gripping by a user as described herein.

In an exemplary embodiment, activation slide tabs 92 include base members 93 fixably disposed in between tabs 92 and arms 90. In addition, arms 90 are of less width than that of tabs 92. That is, arms 90 are narrower than tabs 92.

Sliding activation piece 68 is composed of any material suitable for the applications of the piece and of the mechanical splice optical fiber connector 10 as described herein and within the scope of the present invention. Particularly, activation piece 68 may be integrally formed of molded plastic. Alternatively, a plurality of materials may be used to construct various components of activation piece 68, the components subsequently being connected to assemble sliding activation piece 68.

Now with reference to FIGS. 1–8, mechanical splice optical fiber connector 10 also includes an inner housing 98. Inner housing 98 includes a slide activation portion 100 and further includes a capillary portion 102 mounted to activation portion 100.

Figure 7:
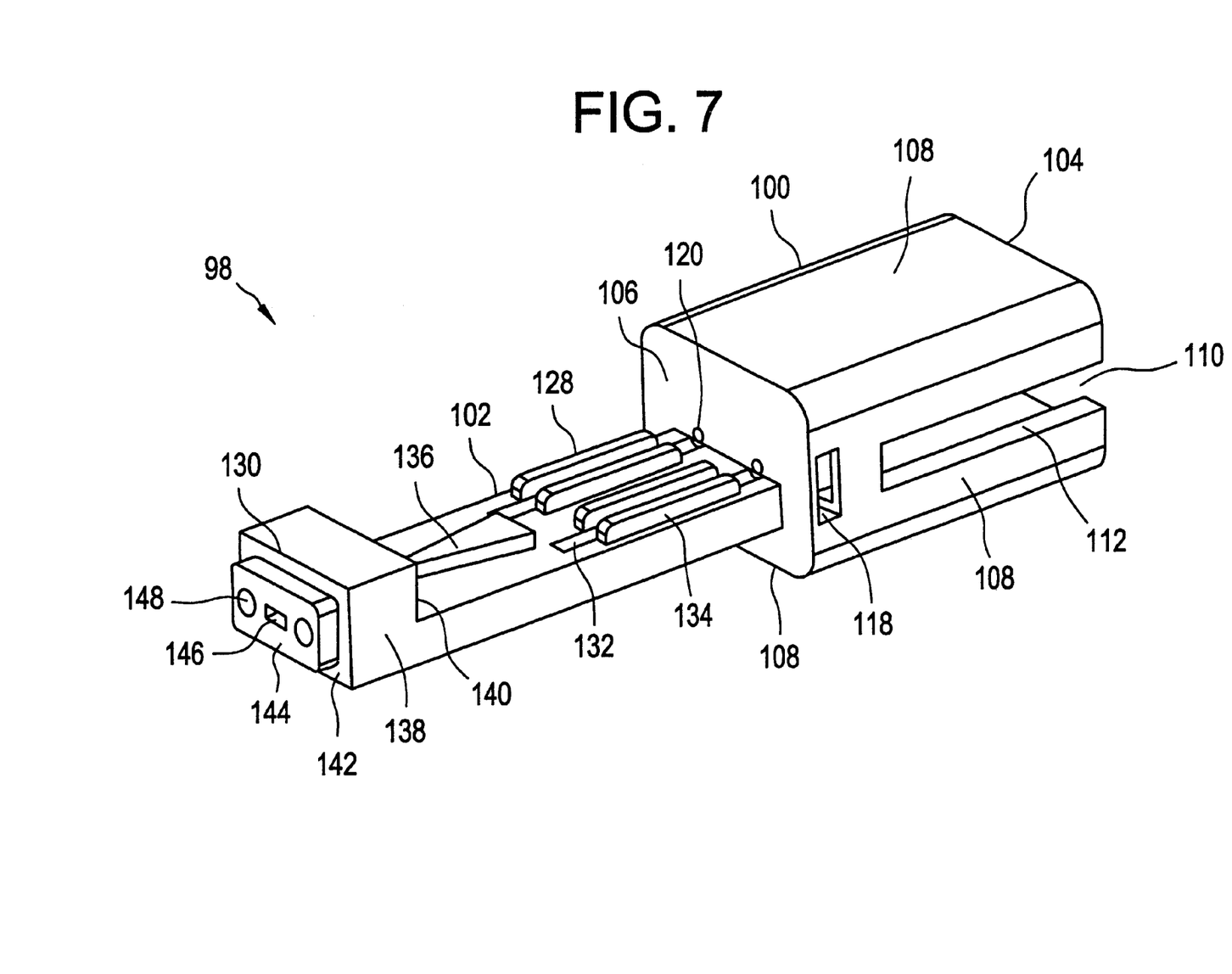
FIG. 7 is a perspective view of an inner housing.
Figure 8:
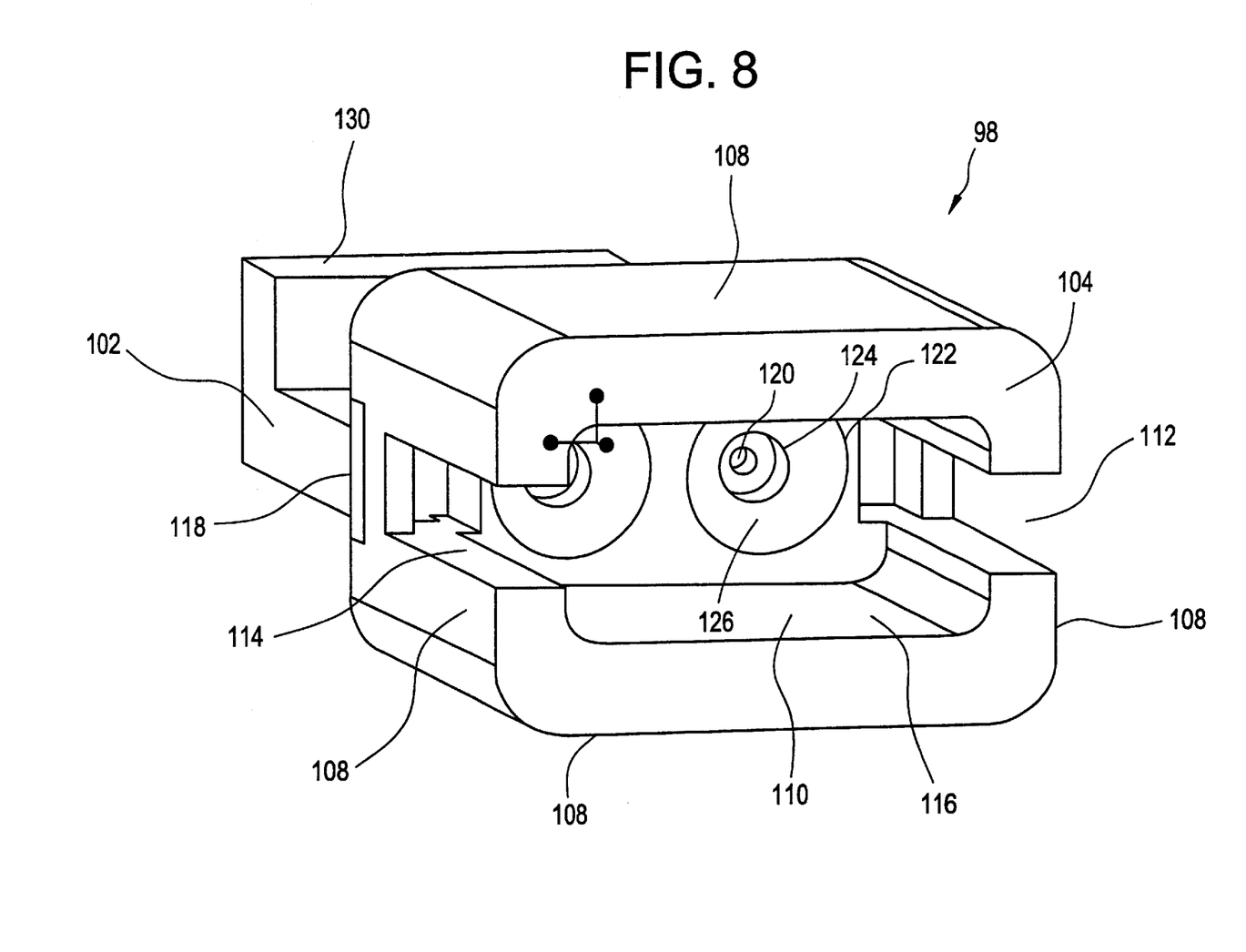
FIG. 8 is another perspective view of the inner housing of FIG. 7.

Slide activation portion 100 includes a first end 104 and an opposing second end 106. Activation portion 100 also includes sides 108 formed perpendicular to first and second ends 104, 106.

Activation portion 100 also includes an activation chamber 110 formed at an interior thereof. Portion 100 further includes first and second side openings 112 and 114 formed at opposing sides 108. First and second side openings 112 and 114 extend from first end 104 in a longitudinal direction toward second end 106. First and second side openings 112 and 114 end before to reaching second end 106. First and second side openings 112 and 114 act as a slide track for slide activation piece 68 as discussed herein.

Portion 100 also includes a chamber opening 116 formed at first end 104 and a latch opening 118 formed at a side 108. Side openings 112 and 114, chamber opening 116, and latch opening 118 expose activation chamber 110.

Slide activation portion 100 also includes fiber holes 120 formed at second end 106 so as to form a pathway from chamber 110, through second end 106, to capillary portion 102. Preferably, portion 100 includes a fiber holes 120 formed adjacent one another.

Fiber holes 120 include chamber openings 122 proximate activation chamber 110 and capillary holes 124 formed proximate capillary portion 102. Chamber openings 122 include collet receptacles 126 formed about fiber holes 120. Collet receptacles 126 are annular indentations for receiving gripping collets 44 upon assemblage of connector 10. In one embodiment, collet receptacles 126 are frusto-conically shaped such that receptacles 126 taper toward fiber holes 120.

Capillary portion 102 is connected to slide activation portion 100 so as to extend perpendicularly from second end 106. Capillary portion 102 includes a fiber connection section 128 formed proximate slide activation portion 100 and a plug section 130 formed distal to activation portion 100.

Connection section 128 includes capillary grooves 132 formed therein. Capillary grooves 132 are formed parallel one another and are located so as to extend from fiber holes 120. Connection section 128 also includes capillary guides 134 disposed on either side of each of capillary grooves 130. A fiber divider 136 is disposed on connection section 128 between capillary grooves 132 and plug section 130. Fiber divider 136 is triangular in shape to facilitate the separation of optical fibers, as discussed herein. Of course, fiber divider may be of any suitable shape to separate optical fibers.

Plug section 130 includes a head 138. Head 138 has a first side 140 and an opposing second side 142. First side 140 is formed proximate fiber divider 136. Second side 142 includes a plug mating portion 144 extending therefrom.

Plug section 130 further includes a fiber passageway 146 formed therein. Passageway 146 traverses head 138 from first side 140 to second side 142. Plug section 130 also includes alignment post holes 148 formed adjacent and parallel to fiber passageway 146.

Inner housing 98 is composed of any material suitable for applications of the piece and of the mechanical splice optical fiber connector 10 as described herein and within the scope of the present invention. Particularly, inner housing 98 may be integrally formed of molded plastic. Alternatively, a plurality of materials may be used to construct various components of inner housing 98, the components subsequently being connected to assemble inner housing 98.

Inner housing 98 also includes capillaries 150 (see FIG. 3). In an exemplary embodiment, there are two capillaries that are positioned within capillary grooves 132 and capillaries guides 134 such that capillaries 150 are in communication with fiber holes 120. Capillaries 150 are elongated tubular elements made of, for example, glass or ceramic.

Figure 9:
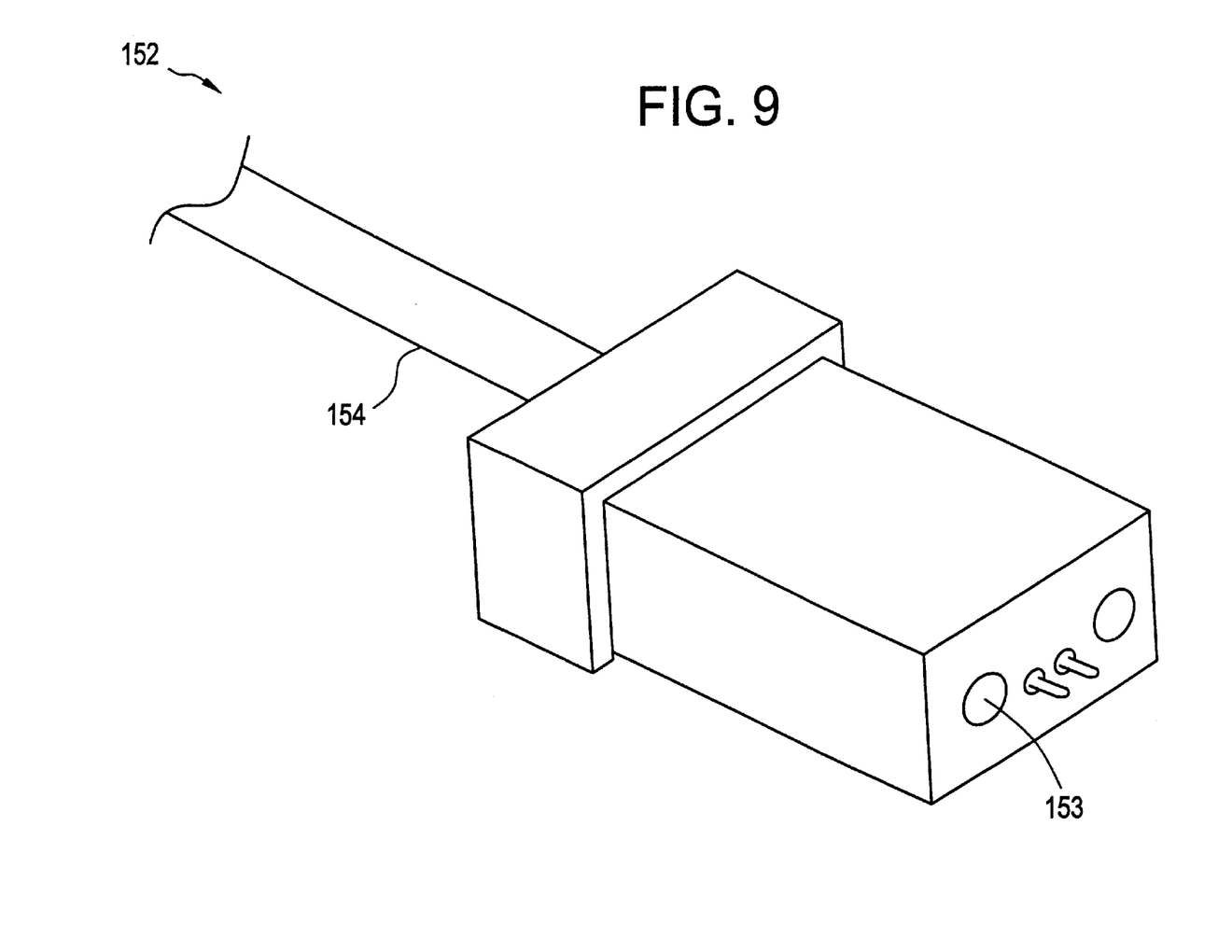
FIG. 9 is a perspective view of a ferrule having optical fiber stubs mounted thereto.

Referring specifically to FIGS. 3 and 9, mechanical splice optical fiber connector 10 also includes a ferrule 152. Ferrule 152 is preferably made from a plastic material and includes optical fiber stubs 154 fixably mounted thereto. In an exemplary embodiment, there are two optical fiber stubs 154 that are connected (e.g. bonded) to ferrule 152 so as to pass therethrough. Fiber stubs 154 are of a predetermined length to extend from ferrule 152. Ferrule 152 also includes alignment post passageways 153 formed therethrough.

Mechanical splice optical fiber connector 10 also includes alignment posts 156 as shown in FIG. 3. Posts 156 align and secure the assemblage of connector 10 by passing through passageways 153 of ferrule 152 and into inner housing 98 wherein the posts are retained.

Referring now to FIGS. 1–3 and 9, mechanical splice optical fiber connector 10 also includes an outer housing 158. Outer housing 158 includes a splice end 160 and an opposing fiber mating end 162. Outer housing 158 is substantially a rectilinear solid having a receiving chamber 164 formed therein. Receiving chamber 164 passes through outer housing 158 from splice end 160 to fiber mating end 162.

Figure 10:
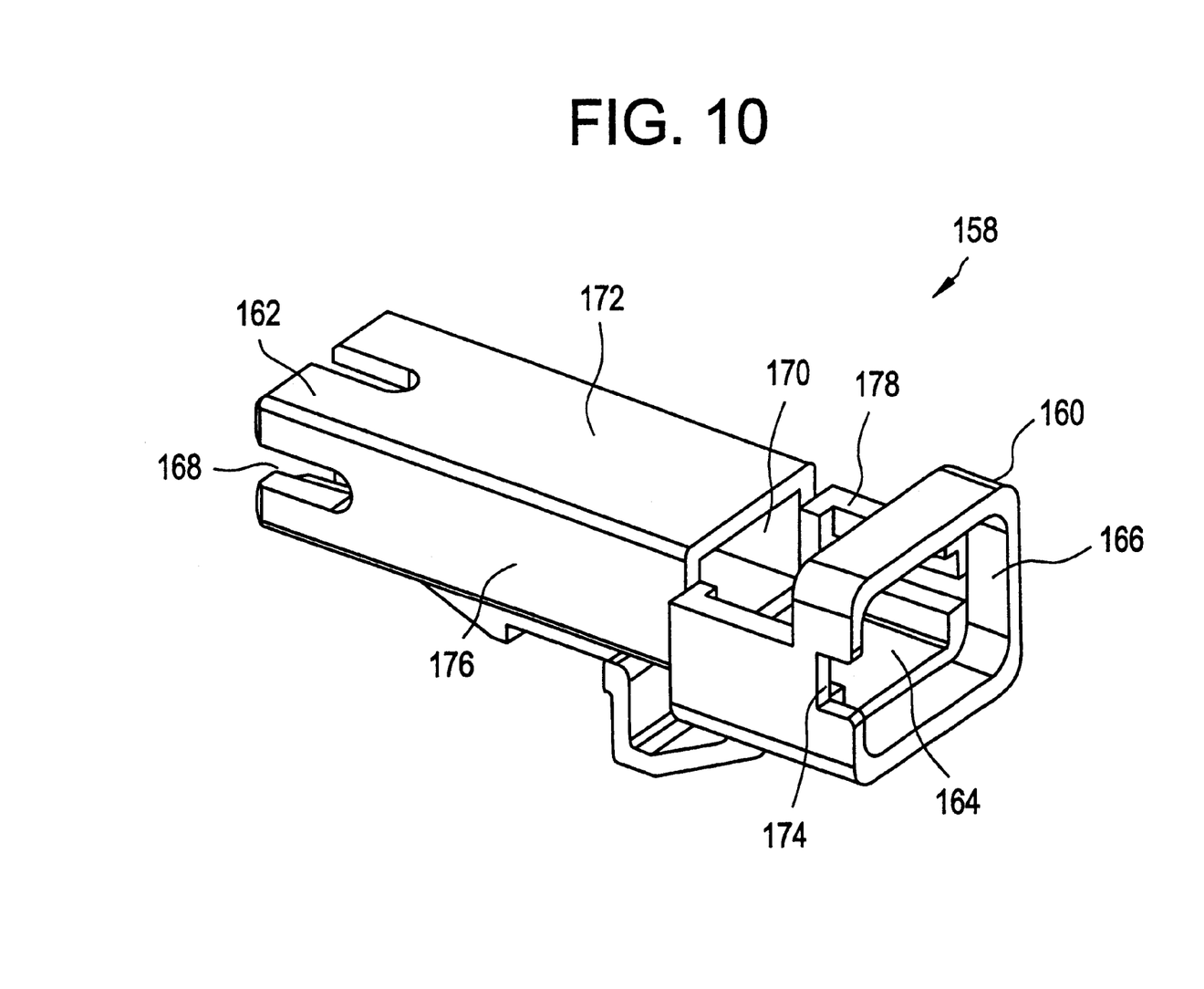
FIG. 10 is a perspective view of an outer housing.

Receiving chamber 164 receives and retains the various components of connector 10 as discussed herein. Outer housing includes a first opening 166 formed at splice end 160 exposing receiving chamber 164. The components are received into chamber 164 through opening 166. Outer housing 158 also includes a second opening 168 formed at cable mating end 162 to allow the extension of optical fibers therefrom for mating with other optical fibers.

Splice end 160 includes a cover opening 170 formed therein, exposing receiving chamber 164. Cover opening 170 is formed on a first side 172 of outer housing 158. Splice end 160 also includes a release opening 174 formed therein, also exposing receiving chamber 164. Release opening 174 is formed on a second side 176 of outer housing 158 proximate first opening 166. First and second sides 172 and 176 are arranged perpendicular to one another.

Outer housing 158 also includes latch flanges 178 disposed at cover opening 170. Latch flanges 178 are protruding members for receiving and retaining a latch.

Outer housing 158 is composed of any material suitable for applications of the piece and of the mechanical splice optical fiber connector 10 as described herein and within the scope of the present invention. Particularly, outer housing 158 may be integrally formed of molded plastic. Alternatively, a plurality of materials may be used to construct various components of outer housing 158, the components subsequently being connected to assemble outer housing 158.

Mechanical splice optical fiber connector 10 also includes a cover 180 as shown in FIG. 10. Cover 180 is shaped to fit flush within cover opening 170 of outer housing 158. Particularly, cover 180 includes a top view portion 182 and an opposing latch portion 184.

Figure 11:
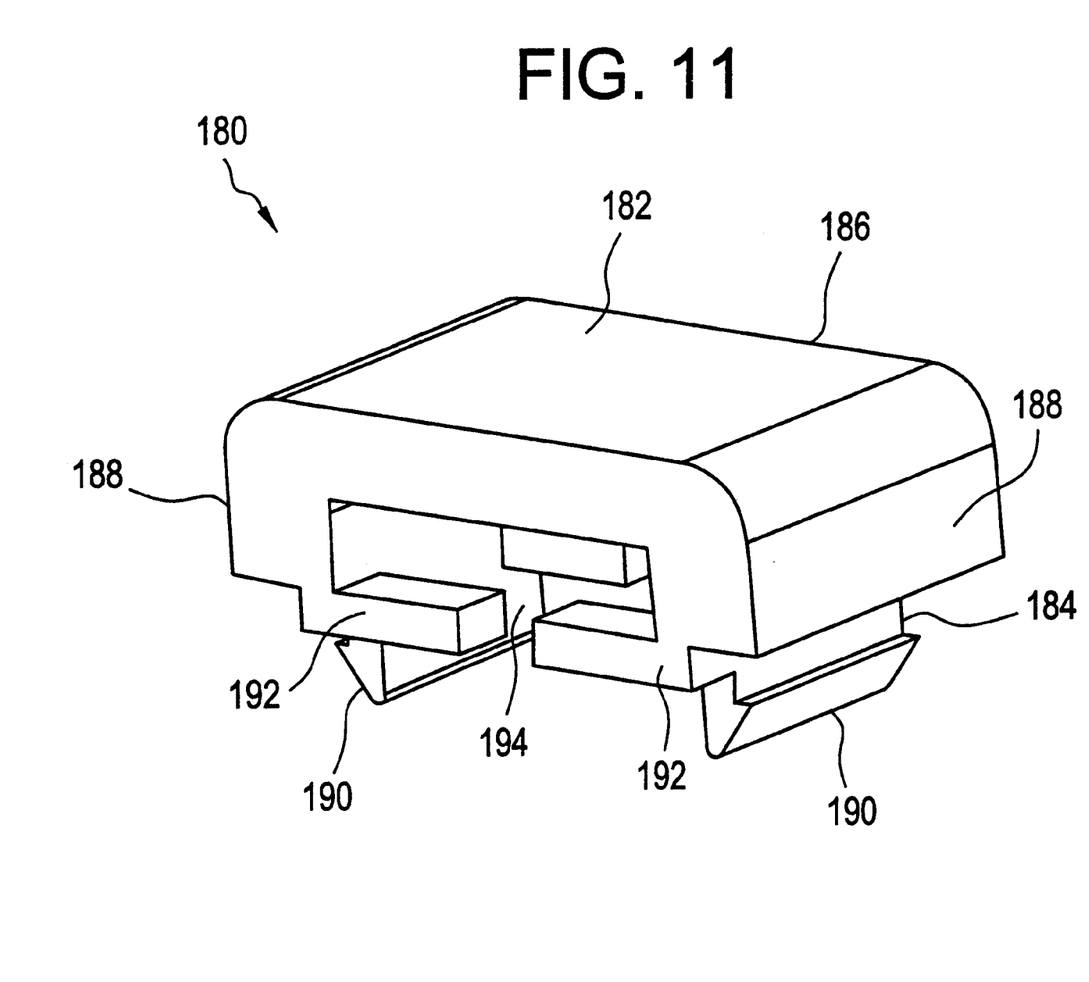
FIG. 11 is a perspective view of a view cover.

Top view portion 182 is shaped congruently with an outer surface of splice end 160 of the outer housing thus consistently maintaining the shape of the splice end across cover opening 170. Specifically, top view portion 182 may be U-shaped or otherwise rectilinearly shaped having a top 186 and sides 188 where sides 188 are located perpendicular to top 186. In an exemplary embodiment, cover 180 includes two sides 188.

Latch portion 184 includes latches 190. Preferably, a latch 190 extends from each of two sides 188 in a direction perpendicular to top 186. Latches 190 are shaped and oriented to be received in receiving chamber 164 of outer housing 158 through cover opening 170 such that latches 190 releasably latch to latch flanges 178.

Latch portion 184 also includes extension arms 192. Arms 192 extend perpendicularly from sides 188 toward an interior 194 of cover 180. Preferably, arms 192 are located so as to be relatively proximate fiber mating end 162 when cover 180 is received within cover opening 170 of the outer housing.

Cover 180 is composed of any material suitable for applications of the piece and of the mechanical splice optical fiber connector 10 as described herein and within the scope of the present invention. Particularly, cover 180 may be integrally formed of molded plastic. Alternatively, a plurality of materials may be used to construct various components of cover 180, the components subsequently being connected to assemble cover 180. In one embodiment, cover 180 is made of a transparent material. In another embodiment, top view portion 182 is made of a transparent material. These various embodiments allow a user of mechanical splice optical fiber connector 10 to view, through cover 180, the mechanical splicing of fibers within the connector.

With reference to FIGS. 1–11, the assembly of mechanical splice optical fiber connector 10 will now be discussed. Gripping collets 44 are inserted within channel 78 of sliding activation piece 68 such that the collets pass through the piece, tip ends 58 extending partially from second end 74 of activation piece 68.

Sliding activation piece 68 with collets 44 inserted therethrough is then brought near first end 104 of inner housing 98 such that arms 90 and collet tip ends 58 are positioned proximate chamber opening 116. First and second side pieces 86 and 88 are aligned with first and second side openings 112 and 114. Sliding activation piece 68 is moved within activation chamber 110 such that first and second side pieces 86 and 88 are inserted into first and second side openings 112 and 114, sides 108 being received within recesses 96. In this configuration, activation side tabs 92 are located outside slide activation portion 100 while arms 90 are located within first and second side openings 112 and 114.

Preferably, sliding activation piece 68 is not mounted or fixed in any manner within connector 10. Instead, activation piece 68 is disposed so as to be movable within connector 10 about gripping collets 44, as described herein.

Next, rear cap 16 is brought proximate first end 104 of slide activation portion 100 of the inner housing. Arms 30 are positioned within first and second openings 112 and 114 and rear cap is located such that second side 22 contacts first end 104 of slide activation portion 100 and first ends 48 of gripping collets 44. Annular flanges 38 facilitate this mating with first end 48 of collets 44. In this way, passageways 32 of rear cap 16 are made to communicate with fiber passageways 52 of the gripping collets.

Positioning rear cap 16 as described, presses tip ends 58 of collets 44 into collet receptacles 126 of slide activation portion 100. Thus, collets are held fixed within activation chamber 110 between rear cap 16 and collet receptacles 126.

Next, alignment posts 156 are inserted into ferrule 152 through alignment post passageways 153. Ferrule 152 with posts 156 is mated with plug section 130 of inner housing 98. Ferrule 152 receives plug mating portion 144 such that fiber stubs 154 and alignment posts 156 enter fiber passageway 146 and alignment post holes 148, respectively. Posts 156 are releasably retained within post holes 148. Fiber stubs 154 extend about fiber divider 136 and into capillaries 150. Portions of both alignment posts 156 and fiber stubs 154 extend from ferrule 152 opposite inner housing 98.

Now, inner housing 98, having attached ferrule 152, rear cap 16, collets 44, and activation piece 68, is inserted through first opening 166 into receiving chamber 164 of outer housing 158. Inner housing 98 is retained within outer housing 158 by adhesion means or, simply, by frictional forces or by any other suitable means.

Cover 180 is now attached to outer housing 158. Cover 180 is brought proximate cover opening 170. The cover is positioned such that latches 190 enter opening 170. Cover 180 is pressed into opening 170 until latches 190 releasably latch onto latch flanges 178. In attaching cover 180 as described herein, extension arms 192 result in a position atop capillaries 150. In this position, arms 192 serve to retain capillaries within capillary grooves and guides 132, 134, thus facilitating mechanical splicing therein.

Inner housing 98 is positioned within outer housing 158 such that ferrule 152 partially extends from second opening 168 at fiber mating end 162, thus exposing a portion of alignment posts 156 and a portion of fibers 154. Slide activation portion 100 the inner housing is positioned such that latch opening 118 is located adjacent release opening 174 of the outer housing.

Mechanical splice optical fiber connector 10 is now assembled as shown in FIGS. 1 and 2. The functioning of mechanical splice connector 10 will now be discussed. As assembled, sliding activation piece 68 is moveable within connector 10 along gripping collets 44. The shape of first and second portions 80 and 82 of channel 78 through which collets 44 pass is such that when slide activation piece 68 is positioned proximate base ends 56 of the collets, fingers 54 are unbiased. In this first open position, an area of biasing space 64 is at its largest. However, when slide activation piece 68 is moved along gripping collets 44 toward tip ends 58, the shape of channel 78 effects the biasing of fingers 54 towards one another thus reducing the area of the biasing space 64. Slide activation piece 68 may be maneuvered proximate outer housing 158 such that arms 90 extend beyond first and second side openings 112 and 114. In this second closed position, latch 94 latches within side 108 at latch opening 118, thus releasably retaining slide activation piece 68. In the second closed position, fingers 54 are biased together and the area of biasing space 64 is at its least.

Termination and use of connector 10 will now be discussed with reference to FIGS. 1–11. Cable 13 containing optical fibers is prepared for termination by removing an external cable jacket and internal insulation layers, thus exposing a predetermined length of the optical fibers.

The prepared cable is brought proximate first end 12 of connector 10. Slide activation piece 68 is located in activation chamber 110. Cable 13, which may include two cables 13, are inserted into first openings 32 of passageways 34 at rear cap 16. Cables 13 are passed through rear cap 16 and then into passageways 52 of gripping collets 44. Cables 13 are passed through passageways 52 and into biasing space 64 until cables 13 reach tip ends 58 of fingers 54. At tip ends 58, cables 13 are passed into fiber holes 120 and through second end 106 of slide activation portion 100. Cables 13 then enter capillaries 150 which communicate with fiber holes 120.

At this time, a user may view the entrance of cables 13 into capillaries 150 through transparent cover 180. As described above, fiber stubs 154 are pre-positioned within capillaries 150. Fiber stubs 154 and cables 13 may be viewed through transparent cover 180, the user positions cables 13 within capillaries 150 to contact fiber stubs 154.

When the cables 13 are satisfactorily contacted against fiber stubs 154, activation slide tabs 92 are moved along side openings 112 and 114 toward outer housing 158. Slide activation piece 68 is placed into the second closed position by latching latch 94 within latch opening 118 as described above. When slide activation piece 68 is placed in the second closed position, fingers 54 are biased tightly together. A portion of cables 13, which extends through the biasing space 64, is held between the biased fingers. In this way, the cables 13 are prevented from moving within connector 10 and a mechanical splicing of cables 13 and fiber stubs 154 is complete. Securing a cable jacket about rear cap 16 finishes the termination of cable 13 at connector 10. For example, a crimp sleeve or a strain-relief member may be utilized.

Upon termination, connector 10 may be utilized in all common connector arrangements. Terminated connector 10 may be used, for example, to mate with another connector within an adapter. Terminated connector 10 may also be fitted directly into a wall mounting.

To un-terminate connector 10, slide activation piece 68 is simply placed into the first open position and the inserted fibers withdrawn from the connector. Slide activation piece 68 is released from the second closed position by inserting a small object through the release opening 174 into the latch opening 118 and pressing the latch 94 to release the latch from side 108. Then, slide activation piece 68 may be readily moved into the first open position.

The mechanical splice optical fiber connector 10 provides for a simple, quick, and effective termination of cable 13 thereto. One benefit of mechanical splice optical fiber connector 10 is that connector 10 eliminates the polishing procedure that occurs in the field because ferrule 152 is polished in the factory. Connector 10 provides an easy entry for the fiber optical cable to be locked into place, without the use of adhesives and without the use of a tool. In addition, the connector may be terminated rapidly and accurately in the field. Likewise, the connector termination may be disassembled quickly and easily without necessitating the use of tools.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mechanical splice connector for a fiber optical cable comprising:
    a linear sliding locking mechanism;
    an inner housing having a first end and a second end, said first end adapted to receive said linear sliding locking mechanism; and
    a ferrule having a first end and a second end, said first end adapted to receive said linear sliding locking mechanism; and
    a ferrule having a first side and a second side, said first side of said ferrule mounted to said second end of said inner housing, said ferrule including a fiber stub extending from said second side;
    wherein said linear sliding locking mechanism includes:
        a base having a passageway;
        a plurality of fingers having a first end and a second end, said plurality of fingers surrounding said passageway and extending from said base at said second end, said first end of plurality of fingers extending from said first end towards said second end;
        a sliding activation piece positioned in said inner housing and surrounding said plurality of fingers; and
        wherein as said sliding activation piece is moved from said second end towards said first end, said plurality of fingers are biased together;
        wherein said sliding activation piece includes an arm having an activation slide tab, said arm is slidingly received by said inner housing, said activation slide tab extending outside of said inner housing.

2. The connector of claim 1, wherein said passageway receives said fiber optical cable.

3. The connector of claim 1, wherein said fiber optical cable extends within said capillary and abuts said fiber stub.

4. The connector of claim 2, wherein said plurality of fingers grip said fiber optical cable when said sliding activation piece is moved towards said first end.

5. The connector of claim 2, further comprising an outer housing surrounding said inner housing.

6. The connector of claim 5, wherein said outer housing includes a cover with a transparent window, said transparent window displays said fiber stubs.

7. The connector of claim 1, wherein said first end of said plurality of fingers are tapered.

8. The connector of claim 1, wherein said plurality of fingers are resilient members.

9. The connector of claim 1, wherein said plurality of fingers includes four fingers.

10. The connector of claim 1, wherein said sliding activation piece includes a body with a channel, said channel is shaped to receive and retain said plurality of fingers.

11. The connector of claim 1, wherein said sliding activation piece includes a body with a first portion channel and a second portion channel, said first portion channel is shaped to receive and retain said plurality of fingers, said second portion channel is shaped to receive and retain said plurality of fingers.

12. The connector of claim 1, wherein said arm includes a latch, said latch connects to said inner housing.

13. The connector of claim 1, further comprising a post extending from said first side of said ferrule.

14. A mechanical splice connector for a fiber optical cable comprising:
    an inner housing having a slide activation portion;
    a linear sliding locking mechanism mounted to said slide activation portion; and
    a ferrule mounted to said capillary portion, said ferrule having a fiber stub extending from a first end of said ferrule;
    wherein said linear sliding locking mechanism includes:
        a base having a passageway;
        a plurality of fingers having a first end and a second end, said plurality of fingers surrounding said passageway and extending from said base at said second end, said first end of plurality of fingers extends within said sliding activation portion;

a sliding activation piece surrounding said plurality of fingers; and wherein as said sliding activation piece is moved from said second end towards said first end, said plurality of fingers are biased together.

15. The connector of claim 14, wherein said passageway receives said fiber optical cable.

16. The connector of claim 15, wherein said plurality of fingers grip said fiber optical cable when said sliding activation piece is moved towards said first end.

17. The connector of claim 14, further comprising:

a capillary portion on said inner housing; and a capillary supported by said capillary portion;

said fiber stub extending from said first end of said ferrule, said fiber stub extends within said capillary.

18. The connector of claim 17, wherein said fiber optical cable extends within said capillary and abuts said fiber stub.

19. The connector of claim 15, further comprising an outer housing surrounding said inner housing.

20. The connector of claim 19, wherein said outer housing includes a cover with a transparent window, said transparent window displays said fiber stubs.

21. The connector of claim 14, wherein said sliding activation piece includes a body with a first portion channel and a second portion channel, said first portion channel is shaped to receive and retain said plurality of fingers, said second portion channel is shaped to receive and retain said plurality of fingers.

22. The connector of claim 14, wherein said sliding activation piece includes an arm having an activation slide tab, said arm is slidingly received by said slide activation portion.

23. The connector of claim 22, wherein said arm includes a latch, said latch connects to said slide activation portion.

24. The connector of claim 14, further comprising a post extending from said first side of said ferrule.

25. The connector of claim 1, further comprising:

a capillary portion on said inner housing; and a capillary supported by said capillary portion;

said fiber stub extending from said first end of said ferrule, said fiber stub extends within said capillary.

* * * * *